Dec. 1, 1964   S. H. RASKIN ETAL   3,159,227
WEIGHING APPARATUS
Filed Sept. 28, 1962   3 Sheets-Sheet 1

INVENTORS
Seymour H. Raskin
Frank G. Vitiello
BY
ATTORNEYS

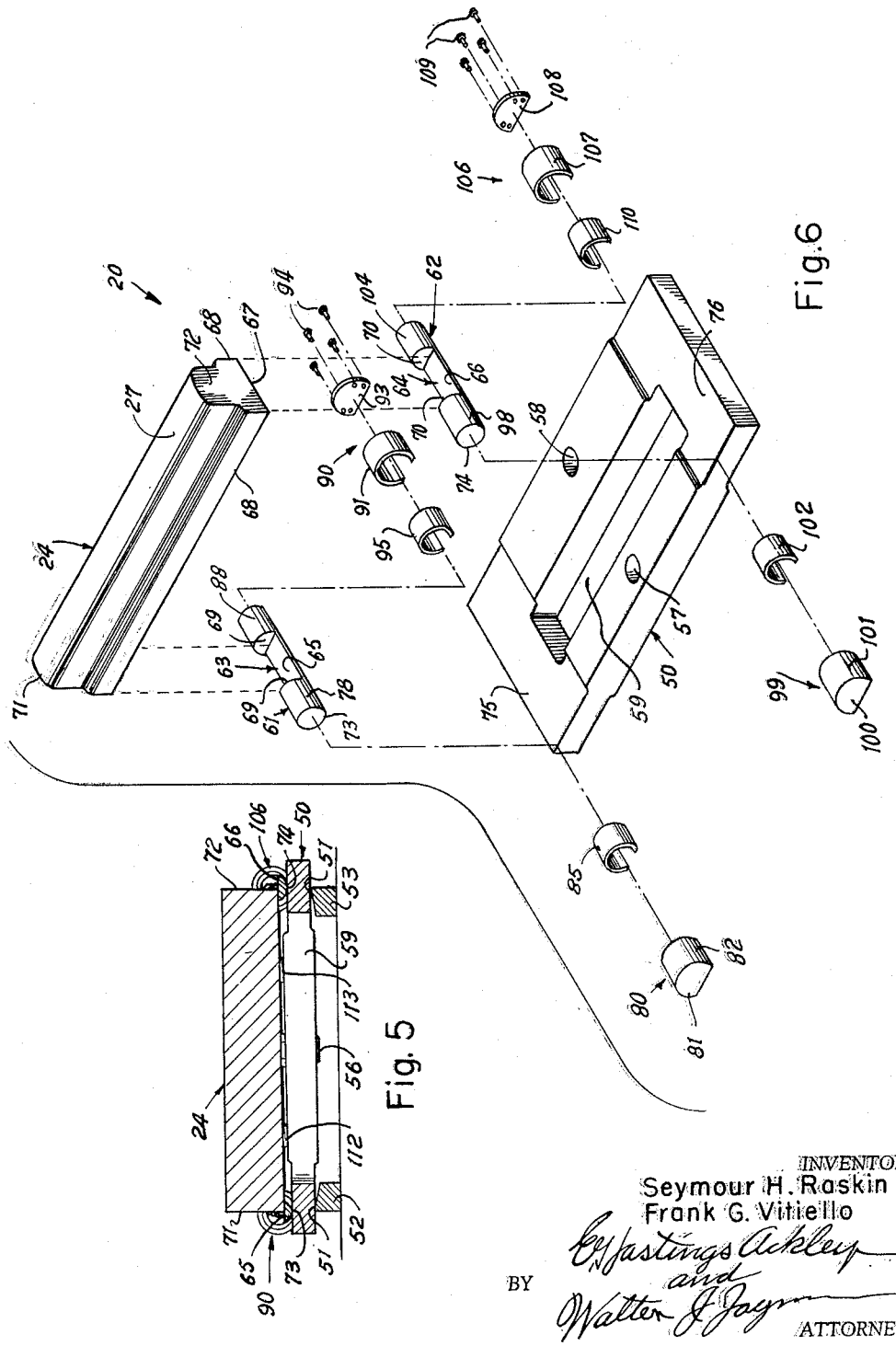

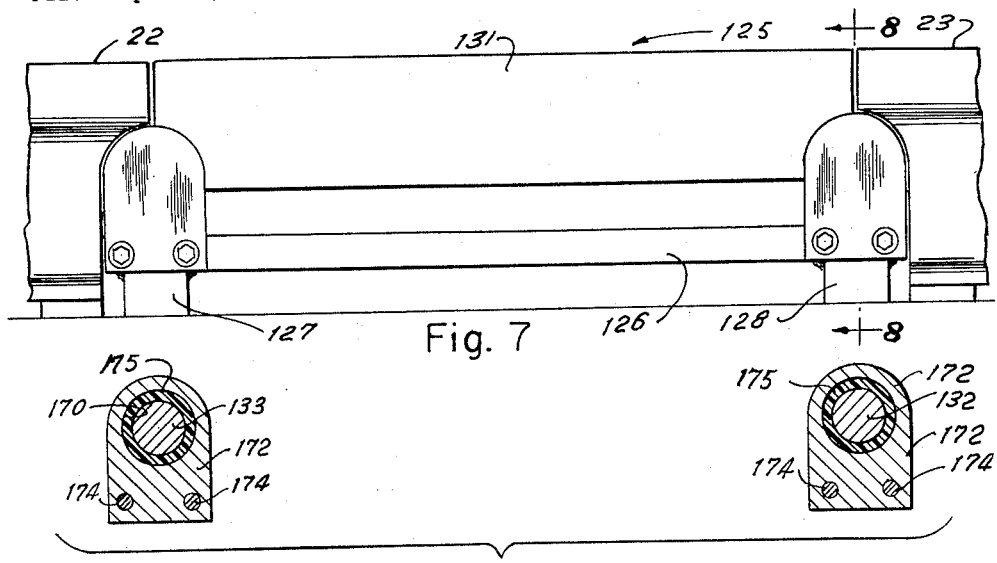
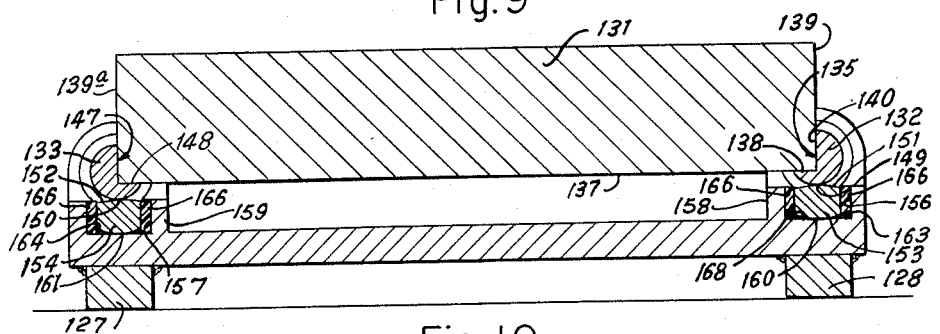
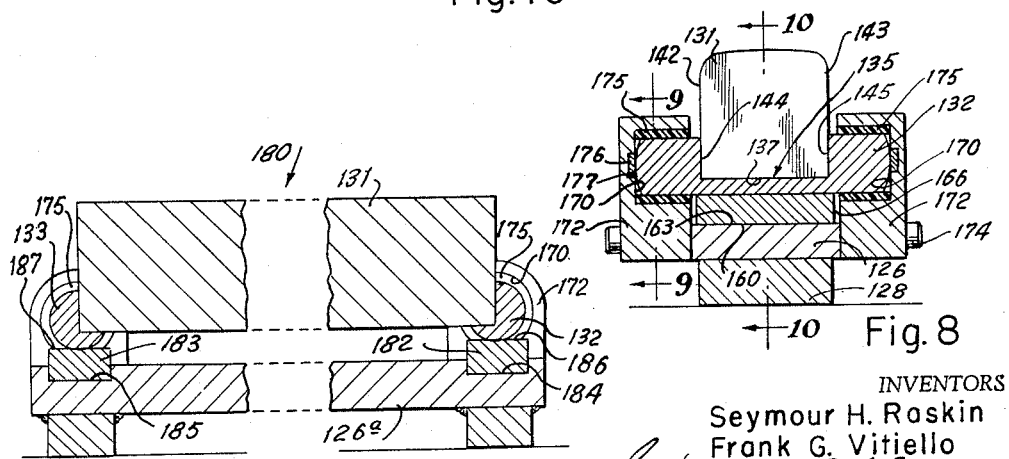

United States Patent Office 3,159,227
Patented Dec. 1, 1964

3,159,227
WEIGHING APPARATUS
Seymour H. Raskin, Dallas, and Frank G. Vitiello, San Antonio, Tex., assignors to Sands Measurement Corporation, Dallas, Tex., a corporation of Texas
Filed Sept. 28, 1962, Ser. No. 226,957
12 Claims. (Cl. 177—163)

This invention relates to weighing apparatus and more particularly to weighing apparatus for weighing moving loads.

An object of this invention is to provide a new and improved apparatus for weighing moving loads, such as railroad vehicles moving over railroad tracks.

Another object is to provide a new and improved weighing device including a weigh beam or rail whose strain or downward deflection as the load moves thereover is proportional to the weight of the load and is measured by any suitable means, such as strain gauges or load cells.

Still another object is to provide a weighing apparatus having means supporting the weigh rail at spaced locations which permit maximum freedom of movement of the weigh rail during the vertical deflection thereof by a load moving over the rail or beam in order that the deflection of the weigh rail not be affected by extraneous strains or forces and be proportional only to the weight of the load.

A further object is to provide a weighing apparatus wherein the support means permit opposite end portions of the weigh rail to pivot about the points of support of the weigh rail as required by the downward flexing of the beam between such points of support.

A still further object is to provide a weighing apparatus wherein the support means includes resilient means which permit longitudinal movement of opposite end portions of the weigh rail toward and away from one another at the points of support of the weigh rail as the load moves over the rail to permit free vertical deflection of the rail but which hold the weigh rail against appreciable displacement from a predetermined position between adjoining sections of a track rail.

Another object of the invention is to provide a weighing apparatus wherein the support means includes a pair of shafts rigidly secured to opposite ends of the weigh rail and resting on a rigid surface whereby the shafts may rotate or roll on the rigid surface.

Still another object is to provide a weighing apparatus wherein the shafts are rotatably mounted in housings having resilient means for permitting limited movement of the shafts toward and away from each other on the rigid surface and wherein the housings engage the shafts to prevent lateral displacement of the weigh rail.

Additional objects and advantages of the invention will be readily apparent from the reading of the following description of a device constructed in accordance with the invention, and reference to the accompanying drawings thereof, wherein:

FIGURE 5 is a sectional view taken on line 5—5 of FIGURE 1;

FIGURE 6 is an exploded perspective view of the weighing apparatus illustrated in FIGURES 1 through 5;

FIGURE 7 is a side view of a modified form of the weighing apparatus;

FIGURE 8 is a sectional view taken on line 8—8 of FIGURE 7;

FIGURE 9 is a sectional view taken on line 9—9 of FIGURE 8;

FIGURE 10 is a sectional view taken on line 10—10 of FIGURE 8; and,

FIGURE 11 is a fragmentary sectional view showing another modified form of the weighing apparatus.

Figure 1:
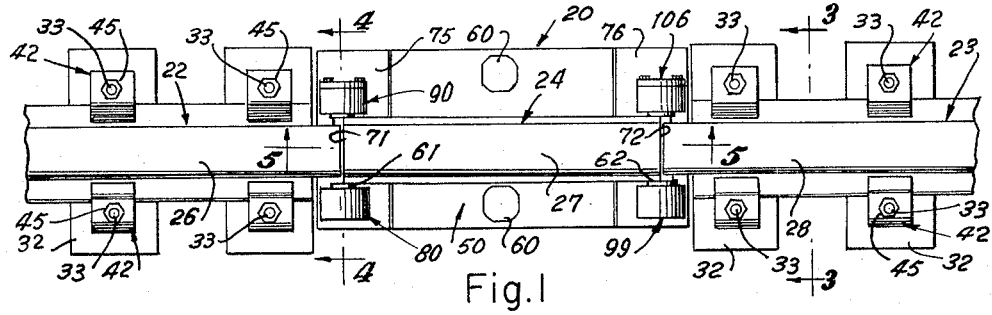
FIGURE 1 is a top view of a weighing apparatus embodying the invention mounted between the adjacent spaced sections of a track rail whereby the weigh beam of the apparatus constitutes a section of the track rail.
Figure 2:
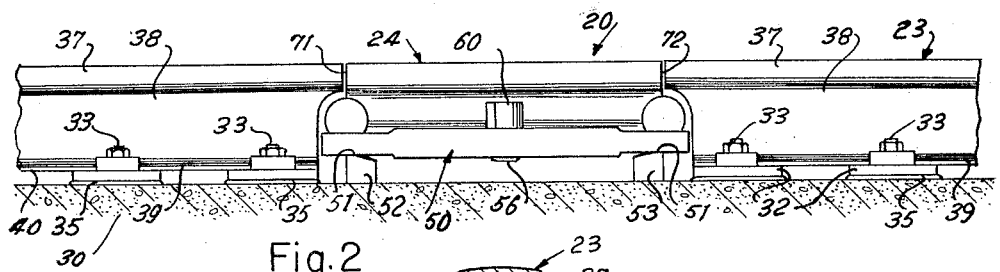
FIGURE 2 is a side view of the weighing apparatus.
Figure 3:
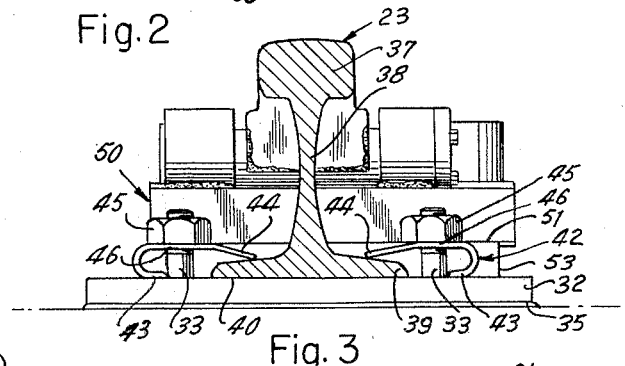
FIGURE 3 is a sectional view taken on line 3—3 of FIGURE 1.
Figure 4:
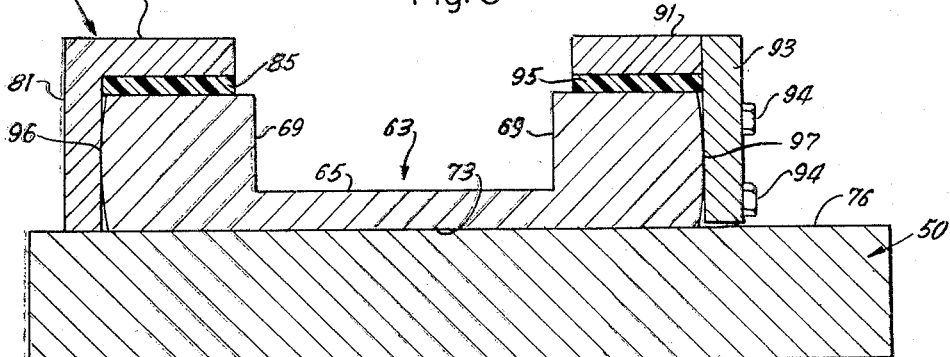
FIGURE 4 is an enlarged sectional view taken on line 4—4 of FIGURE 1.

Referring now particularly to FIGURES 1 through 6 of the drawing, the weighing apparatus 20 embodying the invention is shown between the adjacent sections 22 and 23 of a track rail whereby the weigh rail 24 of the apparatus constitutes a section of the track rail and is longitudinally aligned with the sections 22 and 23 of the track rail whereby a wheel rolling along the track rail moves over the tread 26 of the section 22, tread or supporting surface 27 of the weigh rail and then onto the tread 28 of the rail section 23. The treads of the rail sections and of the weigh rail are positioned at the same horizontal level when no load is present on the weigh rail so that the wheel will not be displaced vertically as it moves from the tread of the rail section 22 onto the tread of the weigh rail or as it moves from the tread of the weigh rail onto the tread of the track rail section 23.

The track rail sections 22 and 23 are secured to a fixed structure such as a concrete foundation 30 by means of the usual transversely extending support plates 32 which are secured to the foundation in any suitable manner as by the bolts 33 whose lower ends are embedded in the concrete foundation 30 and which extend upwardly through suitable apertures in the plates 32. The plates may be rigidly secured to the bolts by welding. Shims 35 may be interposed between the transverse plates and the top surface of the foundation 30 to obtain the desired alignment of the treads of the rail sections with the tread of the weigh rails. Each of the track rails may be of the standard T-shaped form having a head 37 which provides the tread, a web 38 and a base flange 39 whose planar bottom surface 40 rests upon the transverse plates. The rail sections are clamped to the transverse plates and the foundation by means of the usual spring clamps 42 whose lower end portions 43 bear against the upper surfaces of the transverse plates and whose inner free end portions 44 engage the base flanges 39 of the rail sections. The clamps are held in their base flange engaging positions by the nuts 45 threaded on the upper ends of the bolts 33 which extend through suitable apertures in the top portions 46 of the clamps.

The weighing apparatus includes a base plate 50 which rests on the outer upper edges 51 of the transverse support bars 52 and 53 whose lower portions are embedded in the concrete foundation 30. A pair of bolts 56 whose lower end portions are embedded in the foundation extend upwardly through the apertures 57 and 58 of the base plate disposed on opposite sides of the elongate slot 59 of the base plate. The cap nuts 60 threaded on the upper ends of the bolts engage the upper surface of the base plate and hold the base plate on the support bars. The apertures 57 and 58 are disposed at the transverse central axis of the base plate 50 so that the base plate is held by the bolts 56 against longitudinal movement as a unit but the opposite longitudinal portions of the base plate are free to move on the edges 51 of the support bars as the base plate expands and contracts with changes in temperature.

The weight rail 24 is supported on the base plate 50 by means of the pins or shafts 61 and 62 having recesses 63 and 64 which provide planar support surfaces 65 and 66 on which rest the extreme end portions of the planar bottom surface 67 of the weigh rail. The side surfaces 68 of the weigh rail engage the side surfaces 69 and 70 of the shafts 61 and 62, respectively, defining the sides of their recesses. The weigh rail is rigidly secured to said pins or shafts in any suitable manner as by welding.

The vertical end surfaces 71 and 72 of the weight rail are located preferably in the vertical planes passing through the central axes of the shafts 61 and 62 and in which are also located preferably the support edges 51 of the support bars 52 and 53. The arcuate bottom surfaces 73 and 74 of the shafts rest on the flat planar surfaces 75 and 76, respectively, of the base plate 50 so that the shafts may rotate or roll on these surfaces as the rail 24 deflects downwardly when a load moves over the tread or supporting surface 27 thereof. If the opposite end portions of the weigh rail were rigid with the base plate, the downward deflection of the weight rail would be affected by the strains generated in the weigh rail due to the inability of the weigh rail to pivot at the points of support thereof to accommodate such downward deflection.

The round outer portion 78 of the shaft 61 is received in a housing 80 which has a vertical end wall 81 and an outer wall 82 integral therewith. The lower flat surfaces of the housing 80 rest upon the top planar surface 75 of the base plate. The housing 80 is rigidly secured to the base plate in any suitable manner, as by welding. A gasket 85 of a suitable resilient substance, such as nylon or rubber, is interposed between the internal surfaces of the wall 83 and the end portion 78 of the shaft so that the lower arcuate surface 73 of the shaft rests upon the planar surface and the gasket 85 yieldably holds the shaft in a central position in the housing. The other round end portion 88 of the pin or shaft 65 is similarly received in a housing 90 whose outer partially cylindrical wall 91 has its surfaces resting on the top surface 75 and is rigidly secured to the base plate in any suitable manner, as by welding. The vertical end wall 93 of the housing 90 is rigidly secured to the side wall by means of the screws 94 which extend through suitable apertures of the end wall into threaded bores in the wall 91. A gasket 95 of a resilient substance is interposed between the wall 91 and the round end portion 88 of the shaft. The end surfaces of the shaft may be arcuate in order to provide relatively small areas of contact, as at 96 and 97, respectively, with the end walls 81 and 93, respectively, of the housing and so minimize the friction therebetween. The engagement of the ends of the shaft 61 with the end walls of the housings prevents longitudinal movement of the shaft parallel to its axis of rotation while permitting rotary movement of the shaft on the planar surface 75. The shaft 61 is also capable of limited movement parallel to the longitudinal axis of the base plate since the resilient gaskets 85 and 91 permit such movement.

The shaft 66 similarly has one round end portion 98 received in a housing 99 whose end wall 100 is preferably integral with its cylindrical wall 101. The flat lower surfaces of the housing 99 rest upon the planar end surface 76 of the base plate and the housing is secured to the base plate in any suitable manner, as by welding. A resilient gasket 102 is interposed between the round end portion 98 of the shaft 62 and the cylindrical wall 101 of the end housing 99. The other round end portion 104 of the shaft 62 is received in a housing 106 which is identical to the end housing 90 having a partially cylindrical wall 107 whose flat lower end surfaces rest upon the planar surface 76 and is rigidly secured to the base plate by welding. The end wall 108 is secured to the cylindrical wall 107 by means of the screws 109 which extend through suitable apertures in the end wall into threaded bores of the partially cylindrical wall. A resilient gasket 110 is interposed between the wall 107 and the end portion 104 of the shaft. The end surfaces of the shaft 62 are also arcuate to provide very small areas of contact of the shaft with the end walls 100 and 108. It will be apparent that the shaft 62, like the shaft 61, is free to rotate about its longitudinal axis and may move a limited distance on the base plate parallel to the longitudinal axis of the base plate due to the resilience of the gaskets 102 and 110.

It will be seen that the shafts may be inserted into proper position in the end housings by sliding them through the walls 91 and 107 into the housings 80 and 99 and then securing the end walls 93 and 108 to the walls 91 and 107, respectively. The rail 27 may then be inserted into position within the upwardly opening slots 63 and 64 of the support shafts with the end surfaces 71 and 72 properly positioned with respect to the axes of rotation of the shaft so that their end surfaces lie in the vertical planes which pass through the longitudinal axes of rotation of the support shafts and the support edges 51 of the support bars 53.

Any suitable strain or deflection measuring means may be provided for measuring the strain or deflection of the beam or weigh rail as a load moves thereacross. For example, strain gauges 112 and 113 may be bonded to the bottom surface 67 of the rail. The resistances of these strain gauges will increase as the strain in the fibers of the weigh rail at the bottom surface thereof increases due to the downward deflection of the weigh rail as a load moves thereacross. The strain gauges may be connected in a suitable bridge network as set forth in the co-pending application of Seymour H. Raskin executed the 20th day of September, 1962, the output of the bridge network indicating the weight of the load as it passes the midpoint of the span of the weigh rail between the points of support of the beam at the arcuate surfaces 73 and 74 of the shafts with the top planar surfaces 75 and 76 of the support plate. Alternatively, a load cell may be mounted on the foundation 30 in any suitable manner and engage the lower surface of the rail to measure its deflection as the load moves across the rail.

It will now be apparent that the opposite ends of the weigh rail 24 may move toward and away from each other on the base plate so that as the rail deflects downwardly, and then back upwardly as a load moves over the rail, the lower edges of the ends of the beam may move toward and away from one another and may pivot about transverse horizontal axes at their points of support. The weigh rail is thus freed from any extraneous stresses or strains which would be present in the rail if the ends of the rails were rigidly secured against movement towards and away from each other and against such pivotal movement. Such extraneous strains and stresses impair the accuracy of measurement of the weight of the load since such extraneous stresses and strains would vary with such factors as temperature and load.

The end surfaces 71 and 72 of the weigh rail are spaced from the adjacent ends of the track rail sections 22 and 23 so that these rail sections do not interfere in any manner with the operation of the weigh rail. The shafts 61 and 62 on the planar surfaces accommodate such longitudinal movement of the end portions of the weigh rail during deflection and the resilient gaskets while permitting such limited longitudinal movement hold the weigh rail in the desired position between the two track rail sections. The weigh rail and the base plate are preferably formed of the same material, such as steel having the same coefficient of expansion so that no relative movement will occur between the weigh rail and the base plate as the weigh rail and the base plate expand and contract with changes in temperature.

It will thus be apparent that as the load moves thereacross between the ends thereof, the support shafts will tend to rotate in opposite directions, the support shaft 65 rotating in the clockwise direction and the support shaft 66 rotating in a counter-clockwise direction during downward deflection of the beam and rotating in the opposite directions as the load moves off the weigh rail.

The disposition of the vertical end surfaces of the rail in the plane of which the axis of rotation of the shafts lie prevents any vertical or pivotal movement of the beam as the load moves from the tread of one track rail section, such as rail 22, onto the tread of the support rail and also prevents any such pivotal or vertical movement of the beam as the load moves off the tread of the weigh rail onto the tread of the next rail section, such as the rail section 23. If, for example, the end surface 71 were between the axis of rotation of the support shaft 61 and the adjacent end surface of the rail section 22, the whole rail would tend to pivot upwardly about the axis of the shaft 61 as the wheel moved from the tread of the support rail onto the extreme end portion of the tread of the weigh rail.

It will thus be seen that by providing pivotal support means or shafts for the opposite ends of the weigh rail and providing for limited movement of the support shafts on the planar surfaces of the base plate, the degree of deflection of the weigh rail is caused to vary only with the weight of the load and the weighing apparatus is thus made capable of very accurate measurement of the loads moved across the weigh rail thereof.

It will thus be seen that the weigh rail assembly 20 includes a weigh rail supported at longitudinally spaced locations by such means as the support shafts 61 and 62 which are mounted on flat rigid planar surfaces, such as the planar surfaces 75 and 76 of the base plate 50 for both rotatable and limited longitudinal sliding movement and that the longitudinal movement of such opposite ends of the weigh rail are limited by resilient means, such as the gaskets interposed between the shafts and the end housings.

It will further be seen that the ends of the support shafts may be beveled or curved to provide a minimum area of frictional contact between the housings and such ends of the support shafts whereby the frictional forces therebetween are held to a minimum.

It will further be seen that while one track rail has been shown provided with the weighing apparatus of the invention, it will be apparent that one such apparatus may be connected in each of the usual pair of parallel track rails to constitute sections thereof so that the usual pair of railway wheels mounted on a common axle or for rotation about a common transverse axis may simultaneously move over the two weigh rails and the deflection of the two weigh rails may then be simultaneously measured to indicate the weight of the load of such pair of wheels of the railway vehicle.

Referring now particularly to FIGURES 7 through 10 of the drawing, the weighing apparatus assembly 125 embodying the invention includes a base plate 126 supported on the support bars 127 and 128 whose lower end portions are embedded in the base or concrete foundation 130. The base plate may be rigidly secured to the support bars 127 and 128 in any suitable manner as by welding. The opposite ends of the weigh rail 131 are supported by the shafts 132 and 133.

One end portion of the weigh rail is received in the intermediate recess 135 of the pin support shaft 132 so that an end portion of its lower surface 137 rests on the upwardly facing shoulder or surface 138 of the shaft while its vertical end surface 139 abuts the vertical end surface or shoulder 140 of the shaft defining the recess. The extreme end portions of the side surfaces 142 and 143 of the weigh rail 131 may abut the end surfaces 144 and 145, respectively, of the shaft defining the sides of the recess. The shaft 133 is provided with a similar recess 147 so that the extreme end portion of the bottom surface 137 of the weigh rail rests upon the upwardly facing bottom surface or shoulder 148 of its recess and its end and side surfaces similarly abut the end and side surfaces of the shaft defining the recess. The weigh rail is rigidly secured to the shafts by welding.

The lower round or arcuate surfaces 149 and 150 of the shafts 132 and 133 rest upon the upper arcuate surfaces 151 and 152 of the rocker bars 153 and 154 disposed in the upwardly opening elongate slots 156 and 157 provided in upwardly extending transverse flanges 158 and 159, respectively, of the base plate 126. The lower surfaces 160 and 161 of the rocker bars 150 and 152 are also curved in order that the rocker bars be free to pivot about parallel spaced horizontal axes which extend perpendicularly to the longitudinally axis of the weigh rail and so that a small area of contact be provided between the arcuate surfaces 160 and 161 and the upwardly facing planar surfaces 163 and 164 defining the lower ends of the transverse slots of the base plate. Each of the rocker bars is yieldably held against pivotal movement by the gaskets 166 made of nylon or other suitable resilient substance interposed between the sides of the rocker bars and the vertical surfaces of the base plate defining the transverse sides of the slots. The resilient gaskets may have flanges 168 which extend below the lower arcuate surfaces 160 and 161 of the rocker bars. The gaskets resiliently hold the rocker bars in the positions illustrated and permit limited pivotal or rocker movement of the rocker bars about the transverse axes.

Each of the shafts 132 and 133 has opposite end portions laterally outwardly of the rocker bars and of the base plate 126 which are received in the bores 170 of the end housings 172. The end housings are rigidly secured to the sides of the base plate 126 by means of the screws 174 which extend through suitable apertures in the housings into threaded bores of the base plate. Annular gaskets 175 formed of a suitable resilient material, such as nylon, are disposed in the bores and about the round end portions of the shafts and permit rotational movement as well as limited longitudinal movement of the shafts relative to the housings and therefore relative to the base plate.

The housings are provided with polished inserts 176 which are engageable with the arcuate curved end surfaces 177 of the support shafts. The arcuate end surfaces of the support shafts minimize the areas of contact of the shafts with the end housings to minimize the friction therebetween and the inserts are of a suitable hard substance, such as a hard alloy steel, having a low coefficient of friction which also tends to minimize the friction between the shafts and the inserts. The end housings of course also hold the shafts against movement parallel to their longitudinal axes of rotaiton and perpendicular to the longitudinal axis of the weigh rail.

The end surfaces 139 and 139a of the rail preferably lie in the same vertical planes as the axes of rotation of the shafts. The points of contact of the shafts with the rocker bars also preferably lie in these planes.

The weighing apparatus 125 may be disposed between the sections 22 and 23 of a track rail in the same manner as the weighing apparatus 20 and the weigh rail 131 thereof will deflect vertically downwardly as the load, such as a wheel, moves across the weigh rail. Such downward deflection of the weigh rail causes the support shaft 132 to rotate in a clockwise direction and the support shaft 133 to rotate in a counter-clockwise direction. During such downward deflection, the support shafts tend to roll toward one another, yet at the same time, spread longitudinally apart from one another due to bending of the weigh rail and such relative longitudinal movement of the two support shafts causes the rocker bars to rock or pivot slightly and accommodate the next rotating longitudinal shaft displacement. The curvature of the bottom surfaces 160 and 161 of the rocker plates is such that such pivotal movement of the rocker bars eliminates or minimizes any sliding movement of the support shaft on the arcuate upper surfaces 151 and 152 of the rocker bars and thus minimizes the friction therebetween. If desired, the top surfaces of the rocker bars could be planar.

It will be apparent that the weigh rail 131, like the weigh rail 24, is so mounted that it is free to pivot about its points of support and at the same time the portions of the weigh rail at such points of support are free to move a limited distance longitudinally toward and away from each other so that the weigh bar 131 is not subjected to extraneous strains or stresses which would cause its deflection to vary in accordance with other factors than the weight of the load moving thereacross.

It will further be seen that the resilient gaskets 175 while permitting slight movement of the support shafts toward and away from one another hold the weigh rail in proper position between the track rail section 22 and 23.

The weigh rail 131 may have strain gauges secured to its bottom surface 137 to measure the strain of the weigh rail as the load moves thereacross.

The weighing apparatus 180 illustrated in FIGURE 11 is substantially similar to the weighing apparatus 125 varying therefrom only in that the support shafts 132 and 133 of the weigh rail 131 are supported not on rocker bars but on the inserts 182 and 183, respectively, whose lower portions are disposed in suitable transverse slots 184 and 185 of the base plate 126. The inserts are of a suitable substance, such as tungsten carbide, having a low coefficient of friction. The top planar surfaces 186 and 187 of the inserts support the shafts 132 and 133.

Opposite end portions of the support shafts extend into the bores 170 of the end housings 172 and the resilient gaskets 175. The gaskets limit movement of the shafts parallel to the longitudinal axis of the base plate 126a.

The shafts 132 and 133 will of course rotate or roll over the top surfaces 186 and 187 as the weigh rail 131 deflects downwardly as a load moves thereacross and will also slide away from each other on the low friction surfaces of the inserts to accommodate such downward deflection of the weigh rail.

It will now be seen that in all forms of the invention illustrated and described the beam or weigh rail is supported at longitudinally spaced points so that the beam is free to deflect downwardly as a load moves thereover and that it is supported on a support structure, such as a base plate, at such spaced points for both pivotal and limited longitudinal movement at such points, whereby the deflection of the beam is caused to vary accurately with the weight of the load since all forces tending to hinder or restrain such deflection of the beam are eliminated or minimized by such mounting of the beam.

It will further be seen that the provision of the resilient means, such as the gaskets, permits limited longitudinal movement of the shafts, and therefore of the lower edges of the ends of the beam, on the support surfaces of the base plate toward and away from each other due to the vertical force to which the weigh rail is subjected by the load as it passes over the beam and also permits limited movement of both shafts, and therefore of the rail, on the base plate due to the drag force exerted longitudinally of and on the beam by the moving load. It will be apparent that such drag force tends to compress the portion of the rail forward of the point of contact of the load with the rail in the direction of movement of the load and to tension the portions of the rail to the rear of the load. As is fully set forth in the co-pending application of Seymour H. Raskin, executed September 20, 1962, the effects of such drag force on the vertical deflection of the rail may be balanced out by suitable electrical means or are zero when the load is at the midpoint of span of the rail provided the ends of the rail are held against longitudinal movement so that each end is subjected to one one-half of the drag force. Since all the gaskets are of the same substance and are identical in configuration, each of the two shafts will be subjected to one-half of such drag force.

It will further be seen that since the rail is free to move a limited distance longitudinally of the base plate, strain gauges which are bonded to the bottom planar surface of the rail are preferably employed to measure the strain or vertical deflection of the rail since they of course move with the rail. If stationary load cells were employed, such limited longitudinal movement of the rail would impair the accuracy of the measurement of the load.

The foregoing description of the invention is explanatory only, and changes in the details of the construction illustrated may be made by those skilled in the art, within the scope of the appended claims, without departing from the spirit of the invention.

What is claimed and desired to be secured by Letters Patent is:

1. A weighing apparatus including: a beam; support means supporting said beam at locations spaced longitudinally of the beam, said support means permitting vertical downward deflection of the beam as a load moves over said beam and between said support means, said support means permitting pivotal movement of said beam at said locations as said beam between said locations deflects vertically downwardly, said support means including a horizontal support surface below said beam and means rigid with said beam rotatably and slidably resting on said support surface at said locations, said support means also including resilient means engageable with said means rigid with said beam for permitting limited longitudinal movement of said beam at said locations; and means operably associated with said beam for measuring the vertical deflection of the beam.

2. A weighing apparatus including: a beam; means providing a horizontal support surface below said beam; a pair of horizontal shafts secured to said beam at locations spaced longitudinally of said beam and resting on said support surface, said shafts extending perpendicularly of the longitudinal axis of said beam and having end portions extending laterally outwardly on opposite sides of the beam; housing means receiving said end portions of said shafts; and resilient means interposed between said end portions of said shaft and said housing means for restraining and limiting movement of said shafts parallel to the longitudinal axis of said beam, said shafts being rotatable and slidable on said support surface.

3. A weighing apparatus including: a beam; means providing a horizontal support surface below said beam; a pair of horizontal shafts secured to said beam at locations spaced longitudinally of said beam and resting on said support surface, said shafts extending perpendicularly of the longitudinal axis of said beam and having end portions extending laterally outwardly on opposite sides of the beam, said beam having vertical end surfaces, said vertical end surfaces and the axes of rotation of said shafts lying in the same vertical planes when said beam is in normal undeflected position; housing means receiving said end portions of said shafts; and resilient means interposed between said end portions of said shaft and said housing means for restraining and limiting movement of said shafts parallel to the longitudinal axis of said beam, said shafts being rotatable and slidable on said support surface.

4. A weighing apparatus including: a beam; means providing a horizontal support surface below said beam; a pair of horizontal shafts secured to said beam at locations spaced longitudinally of said beam resting on said support surface and holding the bottom surface of said beam spaced from said support surface, said shafts extending perpendicularly of the longitudinal axis of said beam and having end portions extending laterally outwardly on opposite sides of the beam; means holding end portions against movement perpendicularly relative to the longitudinal axis of said beam, permitting rotational movement of said shafts and yieldably limiting movement of said shafts parallel to the longitudinal axis of said beam.

5. A weighing apparatus including: a beam; means providing a horizontal support surface below said beam; a pair of horizontal shafts secured to said beam at locations spaced longitudinally of said beam resting on said support surface and holding the bottom surface of said beam spaced from said support surface, said shafts extending perpendicularly of the longitudinal axis of said beam and having end portions extending laterally outwardly on opposite sides of the beam; means holding end portions against movement perpendicularly relative to the longitudinal axis of said beam, permitting rotational movement of said shafts and yieldably limiting movement of said shafts parallel to the longitudinal axis of said beam, said beam having vertical end surfaces, each of said vertical end surface and the axis of rotation of the shaft at such end surface of the beam lying in the same vertical plane when said beam is in normal undeflected position.

6. A weighing apparatus including: a beam; a base plate; a pair of horizontal shafts secured to said beam at locations spaced longitudinally of said beam and resting on said base plate, said shafts extending perpendicularly relative to the longitudinal axis of said beam and having end portions extending laterally outwardly on opposite sides of the beam; housing means rigidly secured to said base plate, said end portions of said shafts extending into said housing means, said housing means permitting rotational movement of the shafts and preventing movement of such shafts perpendicularly relative to the longitudinal axis of said beam; and resilient means disposed between said housing means and said shafts for yieldably restraining movement of said shafts parallel to the longitudinal axis of said beam, said shafts being rotatable and slidable on said support surface.

7. A weighing apparatus including: a beam; a base plate; a pair of horizontal shafts secured to said beam at locations spaced longitudinally of said beam; a pair of rocker means mounted on said base plate for limited rocking movement about horizontal axes extending perpendicularly relative to the longitudinal axis of the beam, said shafts resting on said rocker means; resilient means yieldably restricting movement of said rocker means, said shafts extending perpendicularly relative to the longitudinal axis of said beam and having end portions extending laterally outwardly on opposite sides of the beam; housing means rigidly secured to said base plate, said end portions of said shafts extending into said housing means, said housing means permitting rotational movement of the shafts and preventing movement of such shafts perpendicularly relative to the longitudinal axis of said beam; and resilient means disposed between said housing means and said shafts for yieldably restraining movement of said shafts parallel to the longitudinal axis of said beam, said shafts being rotatable and slidable on said support surface.

8. A weighing apparatus including: a beam; means providing a horizontal support surface below said beam; a pair of horizontal shafts secured to said beam at locations spaced longitudinally of said beam resting on said support surface and holding the bottom surface of said beam spaced from said support surface, said shafts extending perpendicularly of the longitudinal axis of said beam and having end portions extending laterally outwardly on opposite sides of the beam; means holding end portions against movement perpendicularly relative to the longitudinal axis of said beam, permitting rotational movement of said shafts and yieldably limiting movement of said shafts parallel to the longitudinal axis of said beam; and strain gauge means secured to the bottom surface of said beam at points longitudinally equidistantly spaced from the midpoint of the span of said beam.

9. A weighing apparatus including: a beam; means providing a horizontal support surface below said beam; a pair of horizontal shafts secured to said beam at locations spaced longitudinally of said beam resting on said support surface and holding the bottom surface of said beam spaced from said support surface, said shafts extending perpendicularly of the longitudinal axis of said beam and having end portions extending laterally outwardly on opposite sides of the beam; means holding end portions against movement perpendicularly relative to the longitudinal axis of said beam, permitting rotational movement of said shafts and yieldably limiting movement of said shafts parallel to the longitudinal axis of said beam, said beam having vertical end surfaces, each of said vertical end surfaces and the axis of rotation of the shaft at such end surface of the beam lying in the same vertical plane when said beam is in normal undeflected position; and strain gauge means secured to the bottom surface of said beam at points longitudinally equidistantly spaced from the midpoint of the span of said beam.

10. A weighing apparatus including: a beam; support means supporting said beam at locations spaced longitudinally of the beam, said support means permitting vertical downward deflection of the beam as a load moves over said beam and between said support means, said support means permitting pivotal movement of said beam at said locations as said beam between said locations deflects vertically downwardly; and strain gauge means secured to the bottom surface of said beam at points longitudinally equidistantly spaced from the midpoint of the span of said beam.

11. A weighing apparatus including: a rail; a pair of support shafts, each of said support shafts having a recess intermediate the ends thereof providing a support surface, the end portions of said beams being disposed in said recesses of said shafts engaging said support surfaces of said shafts, said shafts having end portions extending laterally outwardly on opposite sides of the beam; housing means rigidly secured to said base plate on opposite sides of said base plate, said end portions of said shafts extending into said housing means; and resilient means interposed between said end portions of said shaft and said housing means for restraining and limiting movement of said shafts parallel to the longitudinal axis of said beam, said shafts being rotatable and slidable on said base plate, said beam having vertical end surfaces, each of said vertical end surfaces and the axis of rotation of the shafts at such end of the beam lying in the same vertical plane when said beam is in normal deflected position.

12. A weighing apparatus including: a rail; a pair of support shafts, each of said support shafts having a recess intermediate the ends thereof providing a support surface, the end portions of said beams being disposed in said recesses of said shafts engaging said support surfaces of said shafts, said shafts having end portions extending laterally outwardly on opposite sides of the beam; housing means rigidly secured to said base plate on opposite sides of said base plate, said end portions of said shafts extending into said housing means; and resilient means interposed between said end portions of said shaft and said housing means for restraining and limiting movement of said shafts parallel to the longitudinal axis of said beam, said shafts being rotatable and slidable on said base plate, said beam having vertical end surfaces, each of said vertical end surfaces and the axis of rotation of the shafts at such end of the beam lying in the same vertical plane when said beam is in normal deflected position; and strain gauge means secured to the bottom surface of said beam at points longitudinally equidistantly spaced from the midpoint of the span of said beam.

References Cited in the file of this patent

UNITED STATES PATENTS

| 269,752 | Ward | Dec. 26, 1882 |
| 2,793,851 | Ruge | May 28, 1957 |

FOREIGN PATENTS

| 221,285 | Austria | May 10, 1962 |
| 271,516 | Great Britain | Sept. 1, 1927 |
| 974,974 | France | Oct. 4, 1950 |